United States Patent
Martin

[15] 3,677,288
[45] July 18, 1972

[54] FLOW CONTROL VALVE

[72] Inventor: Thomas B. Martin, Micro-Pump Corporation, 1021 Shary Court, Danville, Calif. 94518

[22] Filed: Oct. 8, 1970

[21] Appl. No.: 79,085

[52] U.S. Cl.............................................137/501, 99/307
[51] Int. Cl......................................................F16k 31/36
[58] Field of Search...............137/495, 501, 614.17; 99/282, 99/307

[56] References Cited

UNITED STATES PATENTS 2,623,331  12/1952  Greening................................137/501

Primary Examiner—Henry T. Klinksiek
Attorney—Julian Caplan

[57] ABSTRACT

A structure is provided for use in a globe valve or the like in installations where constant flow is desired despite variations in inlet and outlet pressures. The valve stem is attached to the structure and movement of the stem determines the effective maximum flow through the valve. Inlet and outlet pressures operate upon opposite sides of a diaphragm, and the differential in pressure causes movement of a valve member relative to an orifice and thereby maintains constant flow through said orifice.

9 Claims, 5 Drawing Figures

INVENTOR.
THOMAS B. MARTIN
BY Julian Caplan

FLOW CONTROL VALVE

This invention relates to a new and improved flow control valve which, in an ordinary globe valve body or the like combines a metering orifice which is set by the valve handle and also a control orifice which maintains constant flow through the valve, once it has been set by the valve handle, despite variations in inlet pressure and/or outlet pressure. Reference is made to U.S. Pat. No. 3,357,448 on which the present invention is an improvement.

Ordinary globe valves are constructed so that by adjustment of the position of the valve stem, the effective opening of the orifice is set and such setting is ordinarily effective only if the pressure differential between the inlet and the outlet of the valve remains constant. The present invention provides a means for maintaining constant flow despite variations in the differential of pressure between the inlet and the outlet of the valve.

The valve body is substantially the same in dimensions and appearance as conventional globe valve bodies and hence may be interchanged therewith in standard piping systems. Further, the operating control handle is substantially the same as in conventional valves.

A principal feature and advantage of the invention is the fact that the valve may be installed where the pressure at the inlet or the back pressure at the outlet, or both, are variable. The valve compensates for such pressure variations so that the volume of flow through the valve remains constant. From time to time, as required, such volume may be adjusted by movement of the valve stem.

One of the features of the invention is the simplicity of the construction and the facility with which it may be manufactured.

Still another feature of the invention is the fact that the valve operating structure may be installed and removed through the valve bonnet and the regulating structure may be replaced with great ease.

A feature of a modification of the invention is the use of a balancing piston which enhances the accuracy of the metering valve and more effectively dampens fluctuations in the movement of the valve structure where there are rapid changes in inlet or outlet pressure.

Other objects of the present invention will become apparent upon reading the following specification and referring to the accompanying drawings in which similar characters of reference represent corresponding parts in each of the several views.

Figure 1:
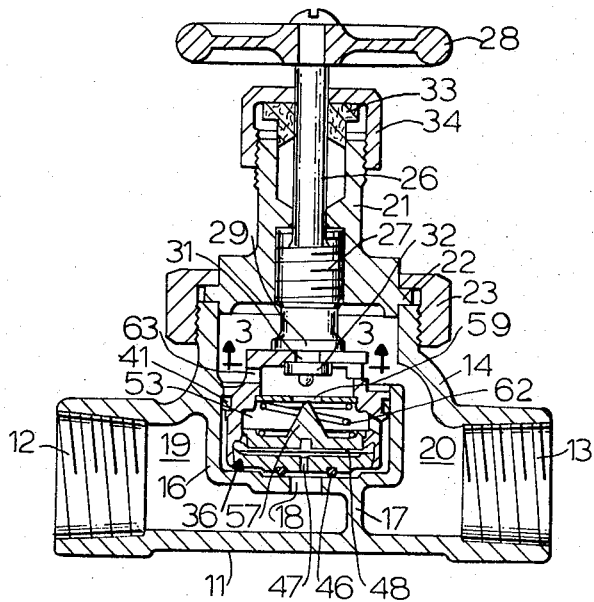
FIG. 1 is a vertical sectional view through a valve formed in accordance with the present invention.

The present invention employs a valve housing 11 which is similar to that of conventional globe valves. Housing 11 has an inlet port 12 and an outlet port 13. It will be understood that the pressure at ports 12 and 13 is subject to variation. Housing 11 is formed with an upward extension 14 and partially within extension 14 is a valve body 16 supported from the bottom of the housing 11 by a support partition 17 which divides the housing 11 into an inlet compartment 19 and an outlet compartment 20. The cylindrical interior of body 16 communicates with inlet compartment 19 through an inlet orifice 18, the body 16 surrounding orifice 16 comprising a valve seat 24.

Supported above extension 14 is a bonnet 21 having adjacent its bottom edge a flange 22 secured to the threaded exterior of extension 14 by an annular nut 23. Within bonnet 21 is a valve stem 26 having a threaded middle portion 27 which turns in a threaded bore in bonnet 21 when the handle 28 of stem 26 is turned. Thus the stem 26 is raised and lowered by the handle 28. Adjacent to the bottom of stem 26 is a base 29 and below the base is a narrow portion 31 with a larger diameter portion 32 below portion 31. Various means may be used to seal stem 26, a conventional means employing a packing ring 33 which is compressed by annular packing nut 34 as well understood in this art.

The valve structure, indicated generally by reference numeral 36, is secured to the lower end of stem 26 by means hereinafter explained. Such structure 36 may consist of an upper portion 37 which is hollow and the bottom of the hollow is closed off by a disc-like lower portion 38 held in place by the inward turned edge 39 of upper portion 37. A ring seal 41 seals the exterior of valve structure 36 to the cylindrical cavity of valve body 16. One means to secure the structure 36 to stem 37 is to form in top 42 of upper portion 37 a radial slot 43 which is undercut in a wider slot 44 (see FIG. 3). To assemble structure 36 on stem 26, the bottom button 32 is moved radially inward in wider slot portion 44 and the narrow portion 31 through the slot 43. Thus, the two parts are fitted together for vertical movement and cannot be separated without removing the structure 36 from the interior of the housing 11 and then sliding them apart.

As is apparent from FIG. 1, one of the features of the invention is the fact that the valve structure 36 may be withdrawn through the opening in upward extension 14 by removing nut 23 and bonnet 21, and drawing the stem 26 upward.

Figure 2:
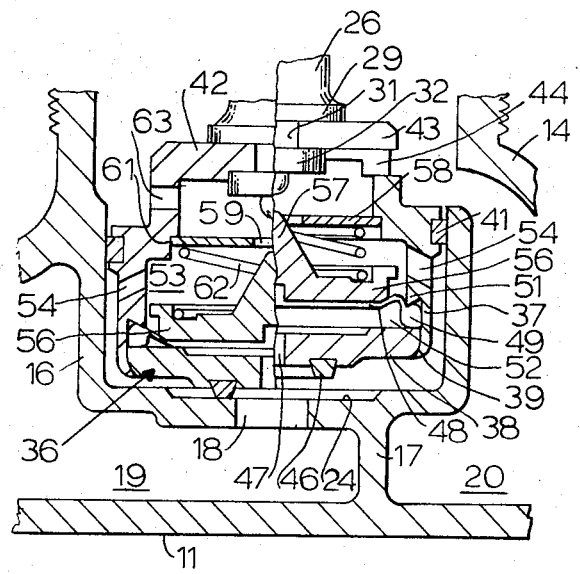
FIG. 2 is an enlarged sectional view of a portion of FIG. 1 showing on the left hand side the valve closed and on the right hand side the valve opened.

In the form of the invention shown in FIGS. 1 and 2, there is an annular seal 46 which may be in the shape of a truncated triangle in cross-section which is inserted in a complementary groove in the bottom of lower portion 38 and which surrounds orifice 18. As structure 36 moves toward and away from seat 24, the volume of flow through orifice 18 is metered.

An opening 47 in the bottom of lower portion 38 inside the confines of seal 46 communicates with one side of a diaphragm 48 disposed inside structure 36. Diaphragm 48 has a peripheral rim 49 which fits under an internal bead 51 on upper portion 37. In assembling structure 36, prior to inward turning of edge 39, rim 49 is installed below bead 51 and lower portion 38 is then forced against the rim 49. Thereupon, the bottom edge 39 is turned inward locking the diaphragm in place. Diaphragm 48 divides the interior of valve structure 36 into an inlet pressure chamber 52 which communicates with the inlet compartment 19 through opening 47 and orifice 18 and an outlet pressure chamber 53 which communicates with housing 16 through openings 54 in the wall of upper portion 37. As shown in FIG. 2, below seal 41 structure 36 is smaller than the interior of body 16, and hence fluid entering within body 16 flows around the outside of structure 36, then thrOugh openings 54 into chamber 53. Fixed to the upper surface of diaphragm 48 is a fitting 56 which has a conical tip 57. Within structure 36 is an orifice plate 58 formed with a central orifice 59 which cooperates with tip 57 to control flow. Plate 58 is fixed against upward movement by shoulder 61 on the interior of top portion 37 and interposed between plate 58 and fitting 56 is a coil spring 62 which biases the fitting downward to the left hand position of FIG. 2. Above plate 58 and also above seal 41 are openings 63 through which the fluid passing through the orifice 59 is discharged into the outlet compartment 20.

Figure 3:
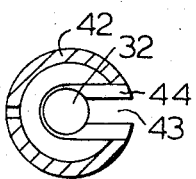
FIG. 3 is a fragmentary sectional view taken substantially along the line 3—3 of FIG. 1.

In the operation of the valve of FIGS. 1-3, the handle 28 is turned until the relationship of seal 46 and orifice 18 meters the flow desired through the valve.

A variable pressure may be applied to inlet port 12 and a variable back pressure may be applied to outlet 13. The flow through the valve is restricted from compartment 19 through openings 54 into chamber 53 on the inlet side of orifice plate 58 depending on the position of seal 46. A pressure drop is caused by the first restriction in flow, which drop increases when the flow increases and decreases when the flow decreases. The drop results in higher pressure on the inlet side of diaphragm 48 and a corresponding lower pressure on the opposite side thereof. When the pressure differential overcomes the force of spring 62, the metering valve begins to function and tip 57 moves into orifice 59 to introduce a second restriction of flow. The second or variable restriction is varied by the force of spring 62 to maintain a constant pressure drop across the first or fixed restriction. Therefore, flow through the fixed restriction and correspondingly flow through the valve is substantially constant. Any variations in supply pressure or back pressure are met automatically by compensating changes in pressure drop in the second restriction. Choice of preload of spring 62 determines the magnitude of pressure drop which must exist before the valve parts move.

Figure 4:
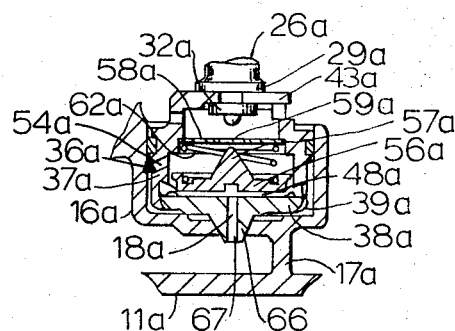
FIG. 4 is a fragmentary sectional view similar to FIG. 1 of a modification.

A modification of the invention is shown in FIG. 4. However, because many of the parts of FIG. 4 are identical or very similar to those of FIGS. 1–3, the same reference numerals followed by subscript $a$ are used to designate corresponding parts. In this form of the invention, the seal 46 of FIGS. 1 and 2 is eliminated. Instead, the lower portion 38a is formed with a downward extending tip 66 which cooperates with orifice 18a to perform the metering function of the valve. The flow control functions are essentially the same in the modification of FIG. 4 as in FIGS. 1–3.

Figure 5:
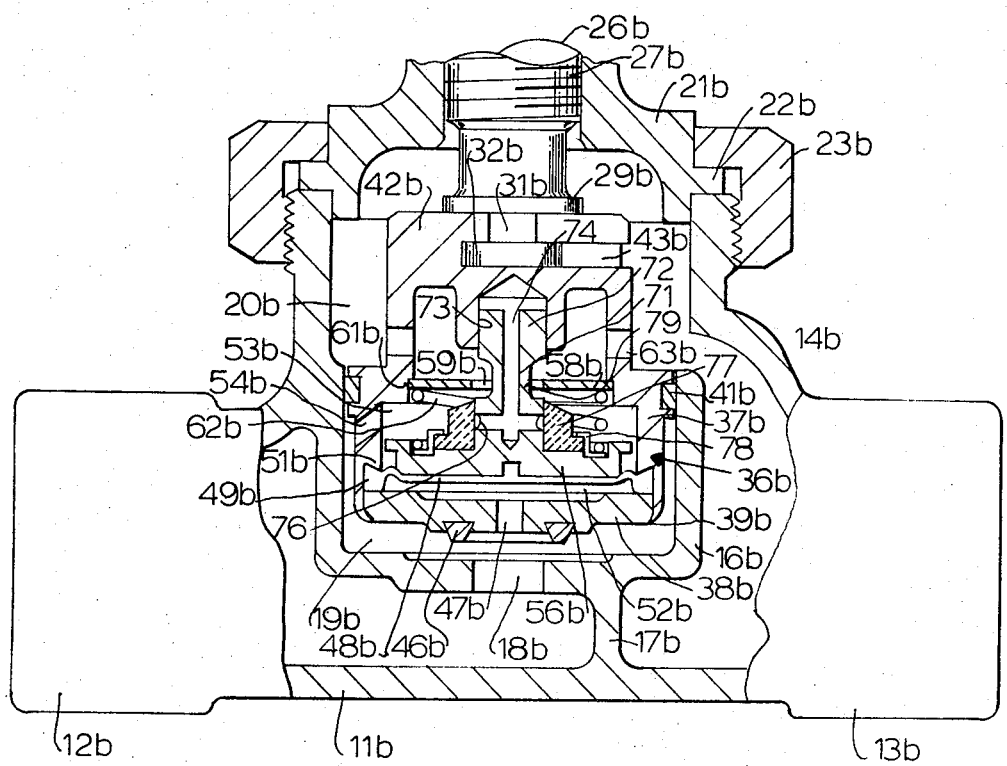
FIG. 5 is a fragmentary sectional view of a further modified value construction having a balancing piston.

FIG. 5 shows a still further modification of the structure, and because many of the parts are similar to those of FIGS. 1–3, the same reference numerals followed by the subscript $b$ are used to designate corresponding parts. In this form of the invention, fitting 56b is formed with an upward extending stem 71 which passes through orifice 59b. On the upper end of stem 71 is a piston 72 which fits within a cylinder 73 formed in the underside of top 42b. The upper end of cylinder 73 is maintained at the same pressure as outlet pressure chamber 53b by means of a longitudinal duct 74 extending downward from the upper end of piston 72 which connects to transverse ducts 76. A filter 77, which may be made of ceramic, sintered metal, felt or other suitable material, and which is held in place by a filter retainer 78 surrounds ducts 76 and prevents the ducts and the cylinder 73 from being clogged by dirt or other foreign matter. It will be seen that in the form of the invention shown in FIG. 5 there is a dampening function. Thus, fluctuations in the pressure do not cause a rapid hunting movement of diaphragm 48b by reason of the use of the balancing piston 72. The control orifice 56b is effectively engaged by the exterior shoulder 79 of stem 71. The area of the balance piston 72 matches the area of the control orifice 59b, and thereby eliminates the effect of the area of control orifice 59b.

What is claimed is:

1. A valve of the character described comprising a housing, a first partition dividing the interior of said housing into inlet and outlet compartments, said first partition forming a cylindrical valve body having an end wall formed with a first orifice opening into said inlet compartment, a movable valve stem, means external of said housing for moving said valve stem toward and away from said first orifice, a hollow valve structure reciprocal within said valve body having an external first seal ring between said valve structure and said valve body and a first valve element in proximity to said first orifice, means connecting said stem to said valve structure to position said first valve element in relation to said first orifice, a movable second partition within said valve structure, having a second seal ring between said second partition and the interior of said valve structure dividing the interior of said valve structure into first and second chambers, a first passage for fluid communication between said first chamber and said inlet compartment through said first orifice, a second passage for fluid communication between said first orifice and said second chamber, a second orifice for fluid communication between said second chamber and said outlet compartment, whereby fluid flow from said first orifice passes through said second passage, then inside said second chamber, then out said second orifice and into said outlet compartment, a second valve element movable with said second partition and cooperable with said second orifice to adjust the pressure drop across said second orifice, and resilient means biasing said second valve element away from said second orifice, whereby the pressure of fluid flowing in said second chamber will be less than the pressure in said second chamber will be less than the pressure in said first chamber by an amount which is limited by the deflection of said spring.

2. A valve according to claim 1 in which part of said valve structure is dimensioned smaller than the interior of said cylindrical valve body, said valve structure formed with at least one opening leading into said second chamber and located on the side of said first seal ring toward said end wall, whereby fluid flow from said first orifice passes inside said valve body around the outside of said valve structure, then inside said second chamber, then out said second orifice and into said outlet compartment.

3. A valve according to claim 1 in which said movable second partition is in the form of a diaphragm.

4. A valve according to claim 3 in which said valve structure is formed with a hollow first portion formed with an internal first shoulder, and an internal second shoulder, an orifice plate defining said second orifice received against said first shoulder, said spring forcing said orifice plate against said first shoulder, said second valve member cooperating with the opposite end of said spring to bias said diaphragm away from said second orifice, a second valve structure portion securing the periphery of said diaphragm, means for holding said first and second portions of said valve structure in assembled position, said first passage consisting of an opening in said second portion.

5. A valve according to claim 11 in which said end wall is formed with an internal seat and in which said first valve element comprises an annular seal ring surrounding said first orifice and cooperable with said seat to meter fluid flow through said valve.

6. A valve according to claim 1 in which said first valve element consists of a tapering tip cooperable with said first orifice to meter fluid flow through said valve, said first passage comprising a central duct in said tip.

7. A valve according to claim 1 in which said valve structure is formed with an internal cylinder on the upstream side of said second orifice in alignment with said second orifice, said second valve element being formed with a shoulder portion cooperable with said second orifice to adjust the pressure drop across said second orifice, said second valve element also having a piston portion reciprocable within said cylinder and formed with ducts to establish fluid communication between the inside of said cylinder and said second chamber.

8. A valve according to claim 7 which further comprises a filter enclosing said ducts to prevent ingress of foreign matter into said ducts and said cylinder.

9. A valve according to claim 1 in which said movable valve stem is formed with a constructed thickness spaced slightly outward from its inner end, said valve structure having a flange formed with a slot extending from the periphery of said flange, said constricted thickness received within said slot with wider portions of said stem both above and below said flange for mechanically connecting said stem to said valve structure.

* * * * *